United States Patent
Fink et al.

(10) Patent No.: US 6,363,071 B1
(45) Date of Patent: Mar. 26, 2002

(54) HARDWARE ADDRESS ADAPTATION

(75) Inventors: Russell Andrew Fink, Columbia; Matthew Aloysius Brannigan, Ellicott City; Shelby Alana Evans, Woodstock; Aswin Morgan Almeida, Bowie, all of MD (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/834,355

(22) Filed: Apr. 13, 2001

Related U.S. Application Data

(60) Provisional application No. 60/228,169, filed on Aug. 28, 2000.

(51) Int. Cl.$^7$ ............................................... H04L 12/28
(52) U.S. Cl. ...................................................... 370/389
(58) Field of Search ................................. 370/389, 392, 370/400–404, 410, 466, 467, 401; 713/200, 201; 709/255, 227

(56) References Cited

U.S. PATENT DOCUMENTS

| | | | | |
|---|---|---|---|---|
| 5,485,455 A | * | 1/1996 | Dobbins et al. | 370/255 |
| 6,047,325 A | * | 4/2000 | Jain et al. | 709/227 |
| 6,101,170 A | * | 8/2000 | Doherty et al. | 370/255 |
| 6,130,892 A | * | 10/2000 | Short et al. | 370/401 |

OTHER PUBLICATIONS

"VPN Firewall Family," Http://www.lucent.com/ins/library/pdf/datasheets/VPN Firewall Family Datasheet.pdf, downloaded Dec. 27, 2000.

* cited by examiner

Primary Examiner—Chau Nguyen
Assistant Examiner—Inder Pal Mehra
(74) Attorney, Agent, or Firm—Leonard Charles Suchy; James E. Weixel

(57) ABSTRACT

An apparatus and method are provided for adapting a link layer address of a network device. A first input/output 410 port is connected to receive data from a first network node 140. The first input/output port 410 has a link layer address and is configurable to one of a plurality of link layer addresses. A second input/output port 420 is connected to output the data to a second network node 160. The second input/output port 420 has a link layer address and is configurable to one of a plurality of link layer addresses. A processor adapts the link layer address of the first input/output port 410 to correspond to a link layer address of the second network node 160 and adapts the link layer address of the second input/output port 420 to correspond to a link layer address of the first network node 140.

50 Claims, 5 Drawing Sheets

HARDWARE ADDRESS ADAPTATION

This application claims benefit of U.S. Provisional Application No. 60/228,169 filed Aug. 28, 2000, which is hereby incorporated by reference.

BACKGROUND OF THE INVENTION

1. Field of the Invention

The present invention relates generally to providing link layer address transparency for security devices installed in Internet-connected local area networks, and more particularly to an apparatus and method for changing the Ethernet Media Access Control (MAC) address at each port of a two-port device to match those of neighboring devices connected to the opposite port.

2. Related Art

A local area network (LAN) may have a number of network nodes, such as personal computers, connected through an Ethernet data transmission line. The network may be connected, through a router, to a wide area network (WAN) to allow sharing of information with other computers or networks. An example of a WAN to which many LANs are connected is the Internet, which is presently the largest WAN in the world.

A LAN typically will include security devices, e.g., a firewall, to protect the network from unauthorized access and other forms of electronic intrusion or attack. Advances in the techniques used to electronically attack Internet-connected networks, however, has led to the need for multi-layered security systems between the router, which connects the network to the Internet, and the firewall, which is connected to the network server. This portion of the network (including the router) usually is not secure and therefore may be subject to unauthorized monitoring.

Many types of electronic attack begin with the monitoring of network traffic in this unsecure portion of the network. In general, as data packets travel through the network, each device replaces its hardware address in the address header of received data packets with the hardware address of the next device in the network. The hardware address of the device is referred to as a link-layer address, which may be, for example, an Ethernet MAC address. An adversary can monitor the addresses contained in the data packets to identify any changes in the network, such as the addition of a new security device.

For example, an adversary may monitor network traffic for an extended period of time. If a new security device is added to the network, the adversary may detect the new Ethernet address corresponding to the new device. From this, the adversary may surmise that the network administrator has detected the unauthorized monitoring and has added a new security device in response. Moreover, the adversary then will know that the network in question is capable of supporting such security devices and therefore is relatively sophisticated. From this, the adversary may surmise that the network contains valuable information. Consequently, it is desirable to provide a means for preventing the unauthorized detection of network security devices through Ethernet address monitoring.

In another application, it may be desirable to add monitoring devices to a network without these devices being detected by the LAN users and administrators. For example, law enforcement may be authorized to install a device to monitor LAN traffic. In such a case, it is desirable for the monitoring device to have the capability to prevent detection through address monitoring.

SUMMARY OF THE INVENTION

It is a general object of the present invention to provide a means for preventing the unauthorized detection of network security devices through Ethernet address monitoring.

It is another object of the present invention to provide a method of hiding a device in a local network segment by assimilating the link-layer addresses of its immediate peer devices, thereby preventing the detection of the device itself or the detection of any alterations to the existing network.

It is another object of the present invention to use the Dynamic Ethernet MAC Addressing (DEMA) technique in an Ethernet network-based bastion device to dynamically reconfigure its Ethernet MAC addresses to match those of the nearest neighbors and thereby appear transparent to the surrounding network infrastructure.

It is another object of the present invention to allow monitoring devices to be added to a network without these devices being detected by the LAN users and administrators.

One aspect of the present invention provides an apparatus for adapting a link layer address of a network device. The apparatus includes a first port connected to receive data from a first network node. The first port has a link layer address and is configurable to one of a plurality of link layer addresses. A second port is connected to output the data to a second network node. The second port has a link layer address and is configurable to one of a plurality of link layer addresses. A processor adapts the link layer address of the first port to correspond to a link layer address of the second network node.

Embodiments of the present invention may include one or more of the following features. The link layer address of first port may be an Ethernet MAC address. The processor may query the second network node to obtain the link layer address of the second network node. The processor may query the second network node to obtain the link layer address of the second network node using Ethernet address resolution protocol. The link layer address of the second network node may be stored in a memory of the processor.

The processor may adapt the link layer address of the second port to correspond to a link layer address of the first network node. The link layer address of the second port may be an Ethernet MAC address. The processor may query the first network node to obtain the link layer address of the first network node. The processor may query the first network node to obtain the link layer address of the first network node using Ethernet address resolution protocol. The link layer address of the first network node may be stored in a memory of the processor.

Another aspect of the present invention provides an apparatus for adapting a link layer address of a network node. The apparatus includes a bus for carrying data. The apparatus further includes a first interface card connected to receive the data from a first network node and output the data to the bus. The first interface card has a link layer address and is configurable to one of a plurality of link layer addresses.

A second interface card is connected to receive the data from the bus and output the data to a second network node. The second interface card has a link layer address and is configurable to one of a plurality of link layer addresses.

A processor is connected to the first and second interface cards. The processor adapts the link layer address of the first interface card to correspond to a link layer address of the second network node.

Embodiments of the present invention may include one or more of the following features. The processor may query the second network node to obtain the link layer address of the second network node. The processor may adapt the link layer address of the second interface card to correspond to a link layer address of the first network node.

These and other objects, features and advantages will be apparent from the following description of the preferred embodiments of the present invention.

BRIEF DESCRIPTION OF THE DRAWINGS

The present invention will be more readily understood from a detailed description of the preferred embodiments taken in conjunction with the following figures.

DETAILED DESCRIPTION OF THE PREFERRED EMBODIMENTS

Figure 1:
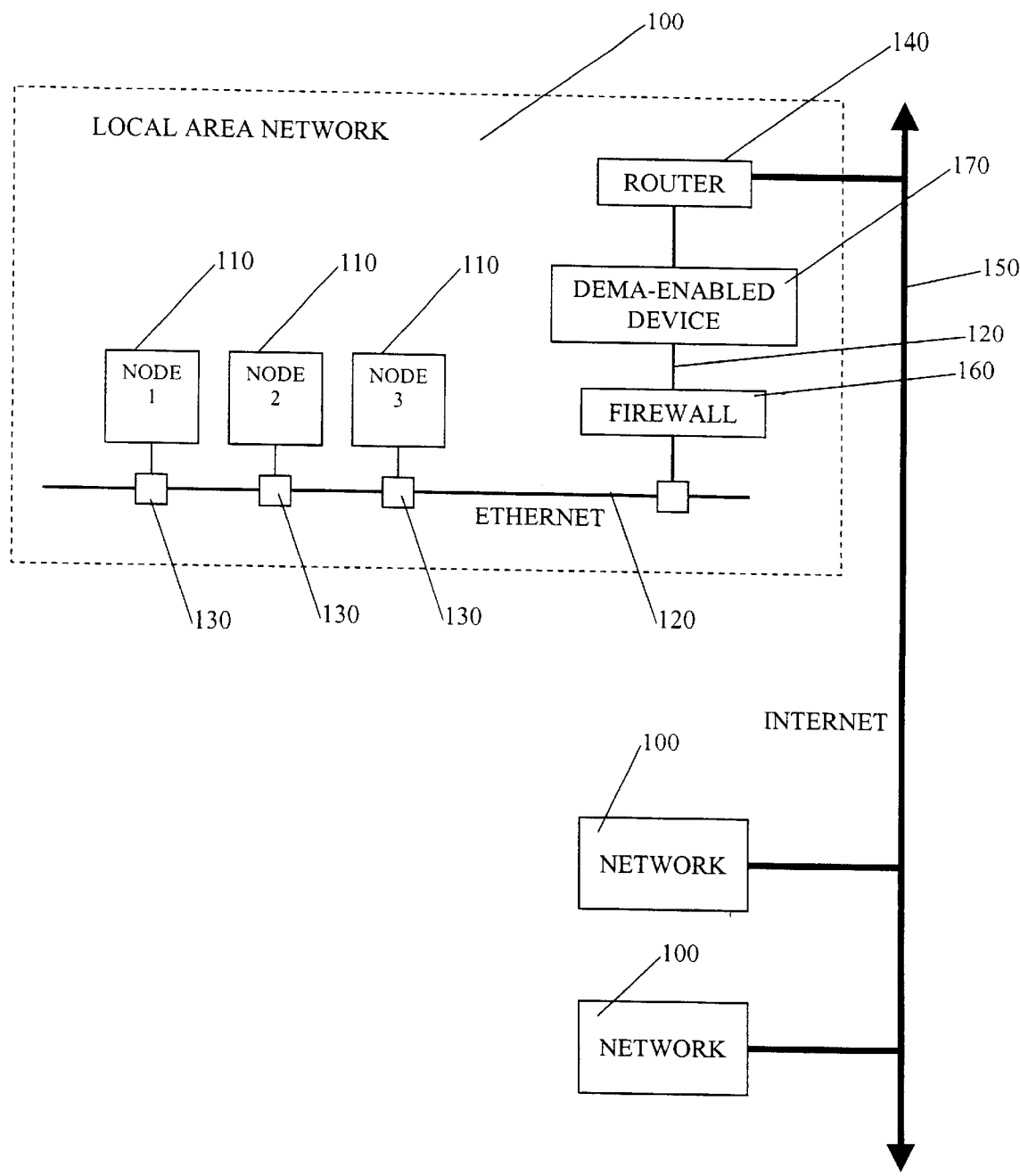
FIG. 1 is a block diagram schematically illustrating local area networks connected to the Internet.

As shown in FIG. 1, an Internet-connected local area network (LAN) 100 may include a number of network nodes 110 connected through an Ethernet data transmission line 120. These nodes 110 may be computers, such as a personal computers (PC), or other devices designed to communicate over a network. Every electronic device manufactured for use in Ethernet networks has a unique hardware address, which is referred to as the Ethernet Media Access Control (MAC) address. The nodes 110 transmit and receive data through their respective Ethernet ports 130 to other nodes 110 in the LAN using Ethernet MAC addresses embedded in the data packets.

The LAN 100 is connected to a router 140, which handles the transmission and reception of data packets to and from the Internet 150. A security device, such as a firewall 160, may be positioned between the router 140 and the network nodes 110 to provide security against unauthorized electronic intrusion and attack. Other security devices may be positioned between the firewall and the router to provide a multi-layered protection scheme.

One area of security concern arises from embedded hardware address information, such as Ethernet MAC addresses, in data packets travelling between the firewall 160 and the router 140. Since this portion of the network is unsecure, an adversary may gain valuable information about network security devices by monitoring this data traffic and detecting the address information.

Network security devices may be protected from unauthorized detection by employing dynamic Ethernet MAC addressing (DEMA). As further described below, a DEMA-enabled device 170 has the capability of assuming the hardware addresses of adjacent components so that it becomes essentially transparent in the hardware address space of the network. This transparency reduces the chance that the DEMA-enabled device 170 will be detected through unauthorized monitoring of the network data traffic.

Figure 2:
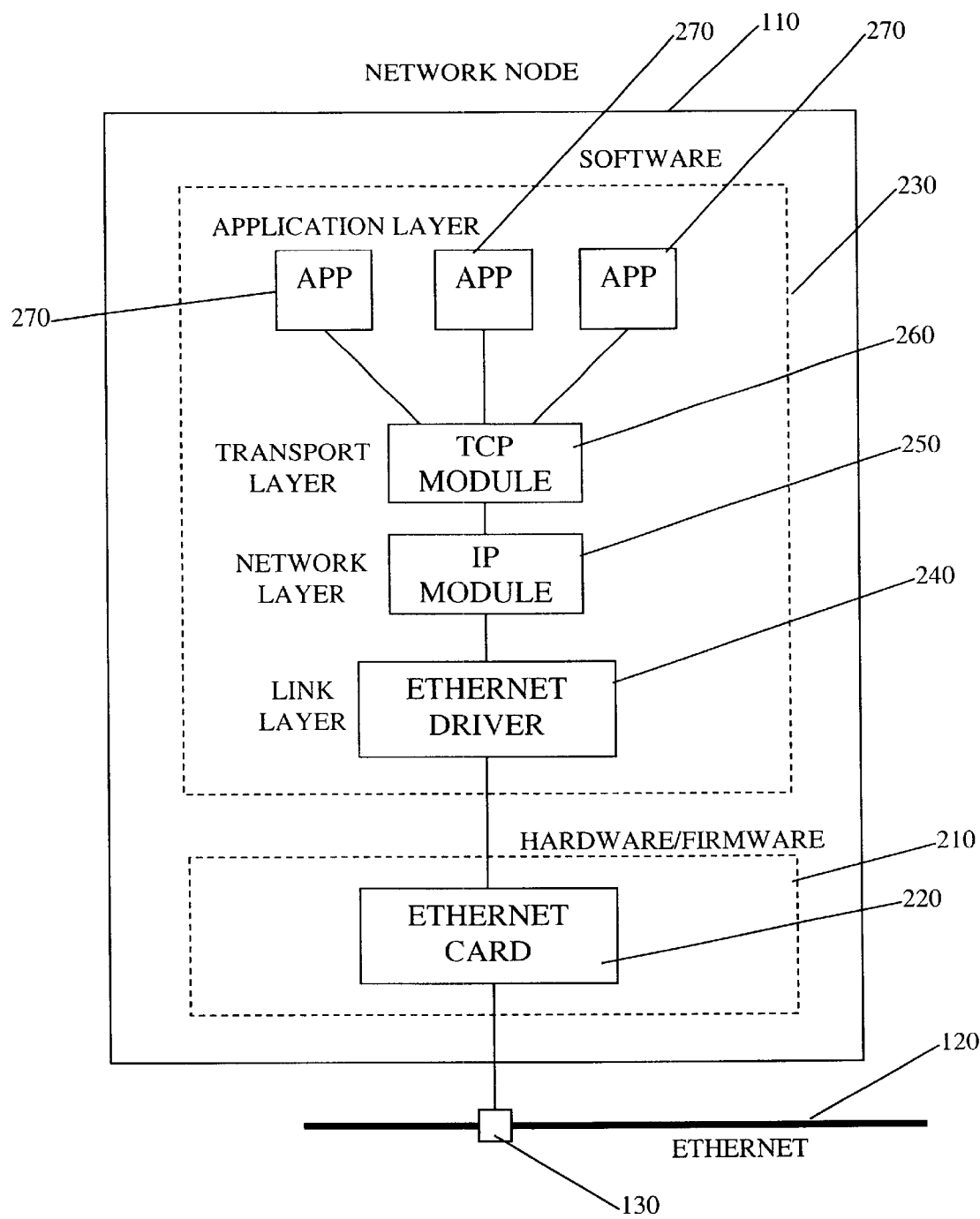
FIG. 2 is a block diagram schematically illustrating a network node with a TCP/IP protocol suite.

FIG. 2 shows the combination of hardware, firmware and software within each network node 110 that is responsible for handling data packets within the network using the Ethernet MAC addresses. Each network node 110 has a hardware/firmware portion 210 that includes an Ethernet card 220 to transmit and receive data over the Ethernet data transmission line 120.

The data transmission line 120 can be implemented by various types of physical media, e.g., coaxial, twisted-pair, or fiber-optic cable, that can transmit and receive data at rate of 100 Mb/s. However, any physical or point-to-point wireless transmission media that supports the Ethernet protocol may be used.

Each node 110 also has a software portion 230 that includes a multi-layered suite of network protocols that enables the node to communicate with other nodes 110 in the LAN 100 and with nodes located in other Internet-connected networks. Each layer of the protocol performs the particular functions necessary to handle the various aspects of data communication over a network. The combination of these functions allows the network node to communicate with nodes in other networks that may be running a variety of different operating systems and may be located anywhere in the world.

The most commonly used protocol suite for Internet-connected networks is Transmission Control Protocol/Internet Protocol (TCP/IP), which as shown in FIG. 2, is a four-layer protocol suite.

The link layer, which is also referred to as the network interface layer, handles the interface between the network node 110 and the physical network data transmission medium, e.g., the Ethernet data transmission line 120. The link layer includes an Ethernet driver 240, which is a software module that controls the hardware on the Ethernet card 220 and the transmission and reception of data packets through the Ethernet cable 120.

Figure 3:
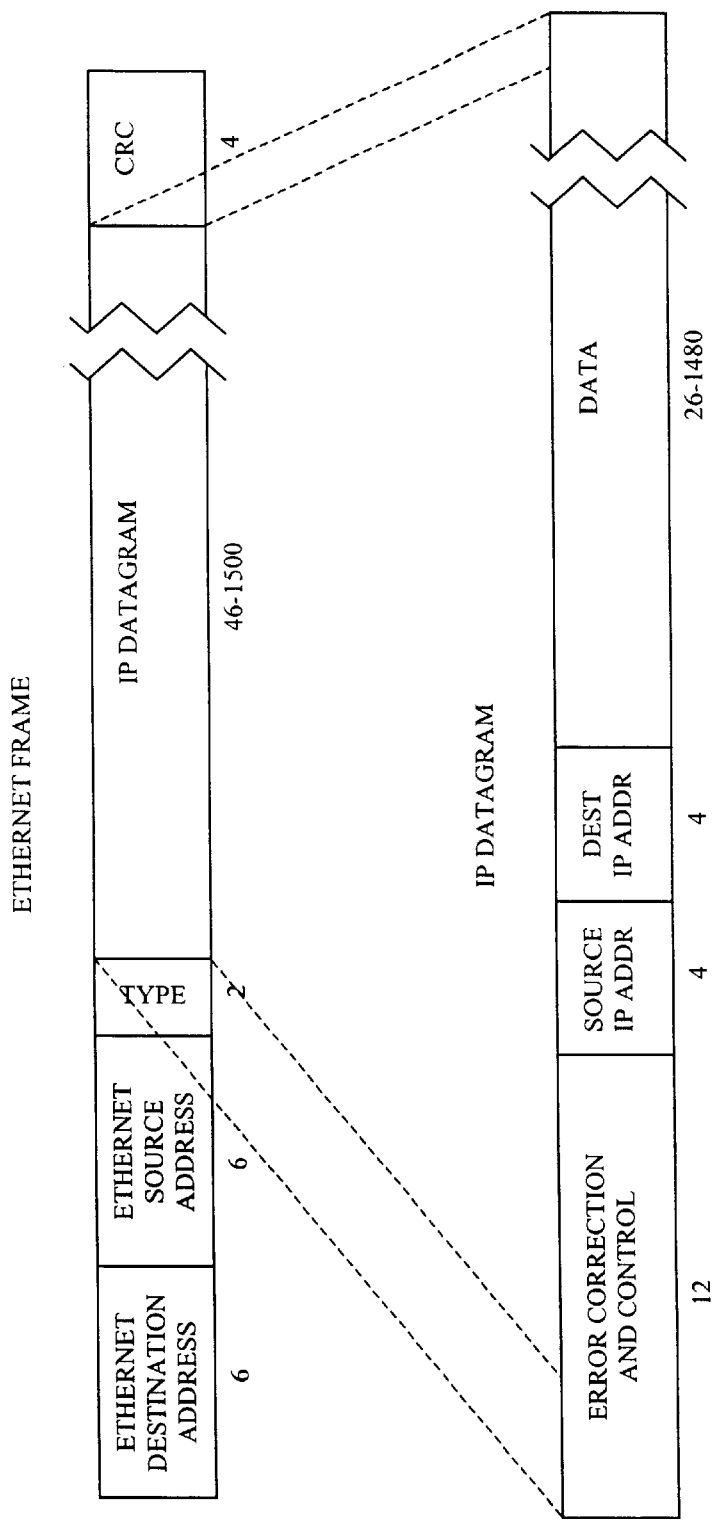
FIG. 3 is a diagram of the data structure of an RFC 894 Ethernet frame containing an IP datagram.

FIG. 3 shows a typical structure for an RFC 894 Ethernet data packet, i.e., Ethernet frame. The Ethernet destination address (the address of the network node that is to receive the data packet) and the source address (the address of the network node that is sending the frame) are each six-byte values at the front end of the frame. The address fields are followed by a two-byte type field, which identifies the type of data, such as the IP datagram shown in this example. The data portion of the frame ranges from 46 to 1500 bytes. The data is followed by a cyclic redundancy check (CRC) for error detection.

The link layer handles the received frames in accordance with the Ethernet source and destination addresses. Each node first determines whether the source address corresponds to its MAC address. If so, then the frame is stripped of the Ethernet header and passed to the network layer, which is discussed below.

The firewall, router, and other network devices also transmit and receive data in this manner.

The data portion of the frame contains an IP datagram, which is a data structure designed for transmission over the Internet. The IP datagram has a header portion with control and error correction bytes. The header is followed by a source and destination IP address. Each computer, or node, connected to the Internet has a unique IP address. The IP addresses of the source node and the destination node are associated with a particular packet of data from the time it is transmitted by the source node until it is received by the destination node.

Referring again to FIG. 2, the network layer includes a software module 250 to process the IP addresses to perform routing of the data packets from node to node. The IP datagram is stripped of its header information and passed to the transport layer.

The transport layer controls the data flow between the network layer and the application layer of each node. In the example of FIG. 2, the transport layer employs a TCP software module 260 to control the flow of data. TCP performs such functions as dividing data received from applications 270 into appropriately sized blocks for handling by the network layer, acknowledging received packets, and setting timeouts to ensure that the other node acknowledges transmitted packets. Through these functions, the TCP module 260 provides a reliable flow of data across the network and eliminates the need for the application programs 270 to handle these functions.

The application layer includes the particular applications 270 running on the network node that may require the transmission or reception of data over the network, including email programs, web browsers, etc.

Dynamic Ethernet MAC addressing (DEMA) allows a device to assume the link layer addresses of neighboring devices, rather than having its own link layer address. Consequently, an adversary monitoring the data packets traveling between the router and the firewall will not detect an address for the DEMA-enabled device and therefore will not be alerted to the presence of the device.

Figure 4:
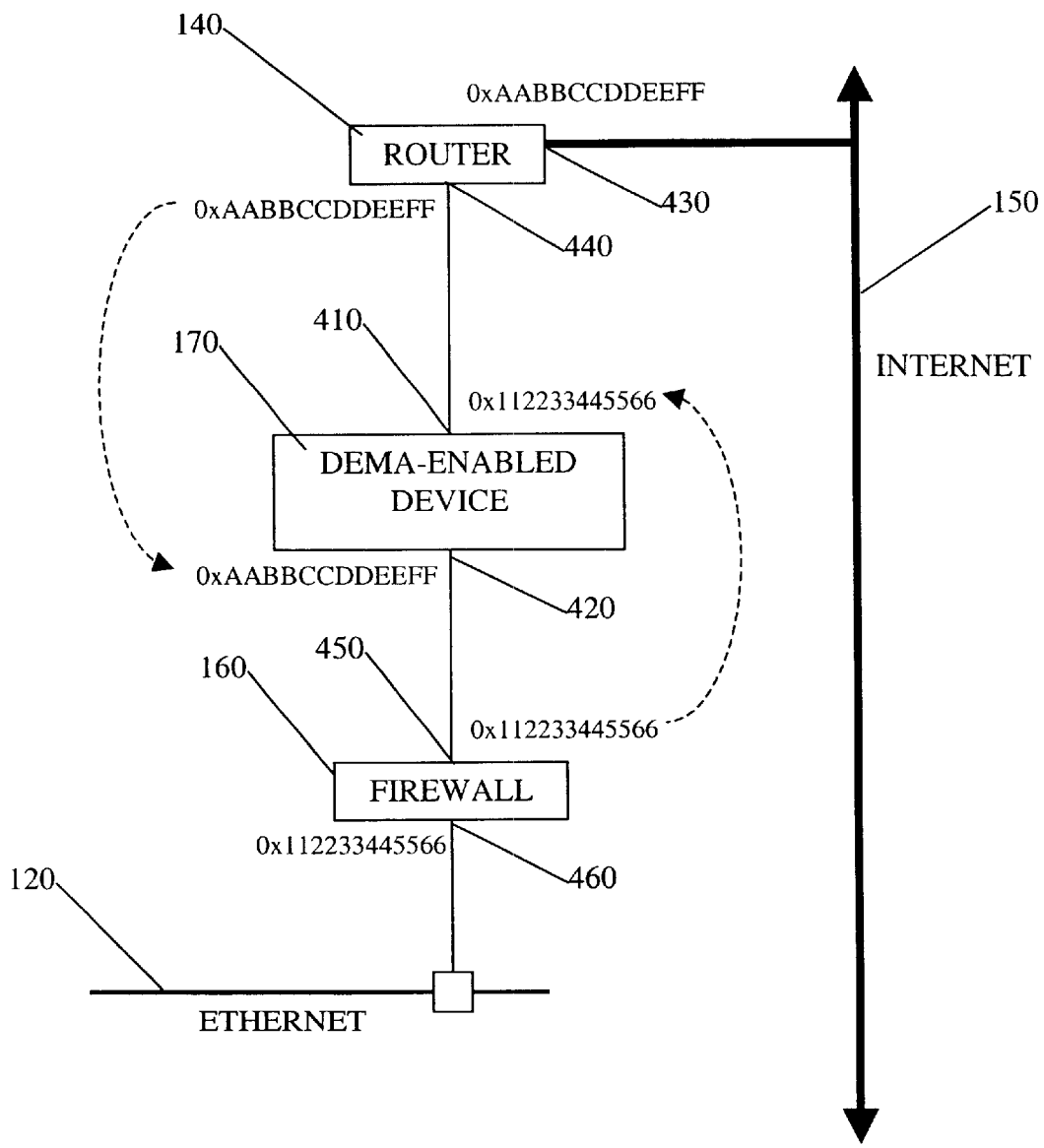
FIG. 4 is a block diagram of a network having a DEMA-enabled device positioned between a router and a firewall.

DEMA may be implemented in a variety software and firmware configurations. For example, as shown in FIG. 4, a DEMA-enabled network security device 170 may be positioned between the router 140 and the firewall 160. The device has software and/or firmware that automatically configures the Ethernet addresses at its ports to match those of the network devices connected to the opposite ports. In alternative embodiments, the firewall 160 or the router 140 themselves may be DEMA-enabled.

In the example of FIG. 4, the DEMA-enabled security device 170 is installed between the router 140, which has an Ethernet address of, e.g., 0xAABBCCDDEEFF, and the firewall 160 which has an Ethernet address of, e.g., 0x112233445566. The DEMA-enabled device 170 has two ports, an Internet-facing port 410 and a network-facing port 420, and is connected in series in the network between the router 140 and the firewall 160. Upon installation, the DEMA-enabled device queries the devices connected to its two ports, i.e., the router and the firewall, to determine their link layer addresses, e.g., Ethernet addresses. This may be done, for example, using an Ethernet address resolution protocol (ARP) request, which causes devices receiving the request to output their Ethernet addresses. Alternatively, the DEMA-enabled device may be directly programmed with the Ethernet addresses of its neighboring devices.

The DEMA-enabled device then configures each of its ports to have an Ethernet address corresponding to the device connected to the opposite port. In this example, the Internet-facing port 410 of the DEMA-enabled device 170 is configured to have the address of the firewall (0x112233445566) and the network-facing port 420 is configured to have the address of the router (0xAABBCCDDEEFF).

Data packets received from the Internet 150 having a destination address of 0xAABBCCDDEEFF are received by the router 140 through its Internet-facing port 430. The router 140 strips the header and replaces it with one having the router address (0xAABBCCDDEEFF) as the source address and the firewall address (0x112233445566) as the destination address. The router 140 then outputs the data packet through its network-facing port 440.

The DEMA-enabled device 170 receives the data packet from the router 140 through its Internet-facing port 410, which has assumed the address of the firewall, and processes it. The DEMA-enabled device 170 leaves the header unchanged so that it has the router address (0xAABBCCDDEEFF) as the source address and the firewall address (0x112233445566) as the destination address when it is output through the network-facing port 420 of the DEMA-enabled device 170 to the firewall 160.

The firewall 160 receives the data packet at its Internet-facing port 450 and processes it. The firewall 160 replaces the header with one having the address of a particular network node 110 as the destination address and the firewall address (0x112233445566) as the source address. The firewall 160 then outputs the data packet through its network-facing port 460 to the Ethernet data cable 120 that connects to the network nodes.

Figure 5:
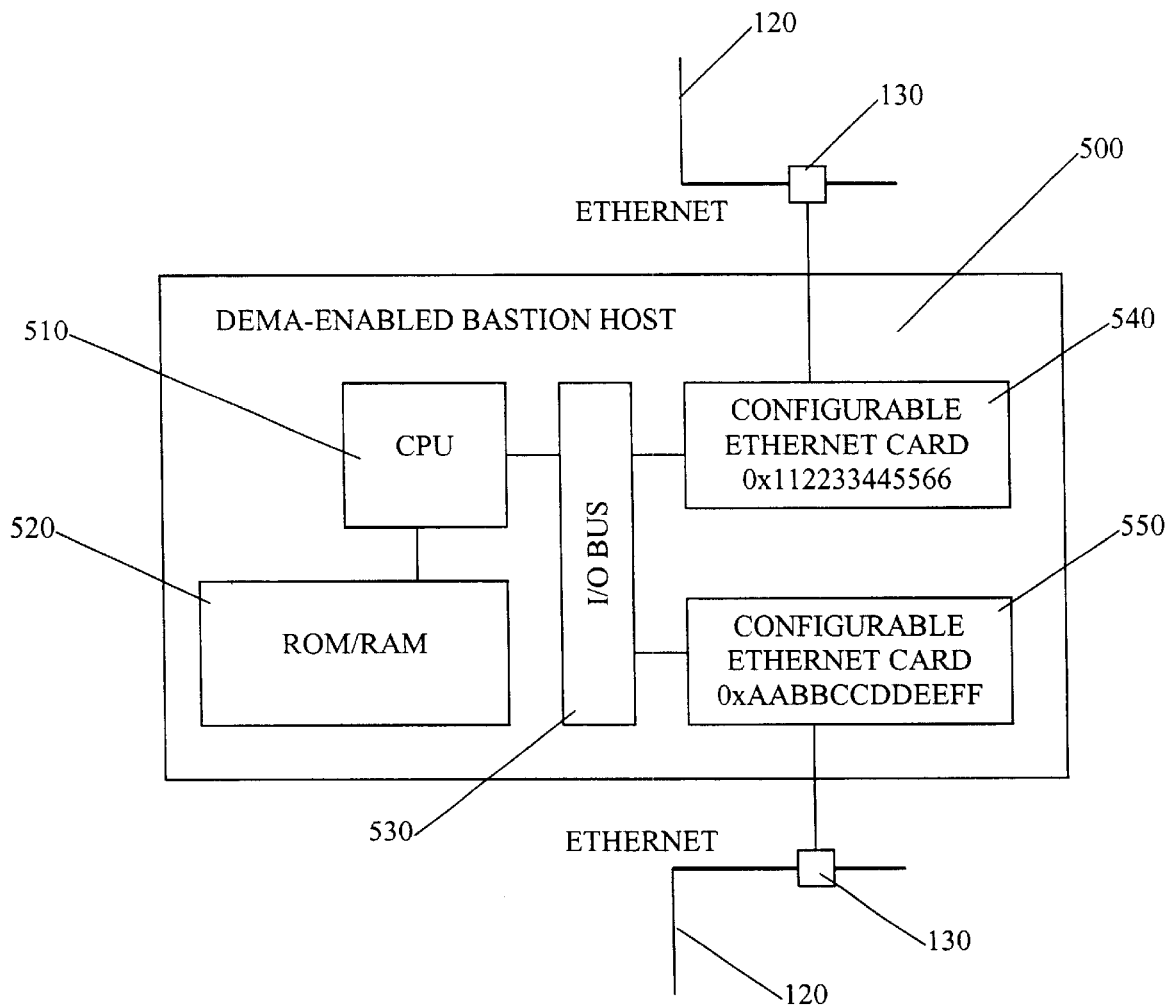
FIG. 5 is a block diagram of a DEMA-enabled bastion host.

As shown in FIG. 5, a PC may be configured as a DEMA-enabled bastion host 500 to protect a network from unauthorized intrusion and attack. The bastion host 500 is a two-port device that is connected in series in a network to act as a buffer between the network nodes and the Internet, e.g., installed between a router and a firewall. The host has a central processing unit (CPU) 510, read only and random access memory (ROM/RAM) 520, and an input/output bus (I/O bus) 530. The CPU 510 and ROM/RAM 520 run software modules that implement DEMA, a network protocol suite, such as TCP/IP, and the bastion host security functions to be performed by the host 500.

Two configurable Ethernet cards 540 and 550 are connected to the I/O bus 530, each of which includes firmware allowing the card to be configured to a different Ethernet address. Each card 540 and 550 is connected to a different one of the two ports of the device 130. In this example, one of the cards 550 is configured by DEMA software to have the same Ethernet address as the router (0xAABBCCDDEEFF) and the other card 540 is configured to have the same Ethernet address as the fire wall (0x112233445566). The device handles data packets in a manner similar to that discussed above with respect to FIG. 4.

Each of the embodiments discussed above provides a novel link layer address adaptation system and method that achieves the above-discussed objects of the present invention.

In addition, because the DEMA-enabled device does not have its own link layer address, it has the advantage that an adversary monitoring data packets passing through the network would not be alerted to the presence of the DEMA-enabled device. Moreover, because the DEMA-enabled device determines (or is programmed with) the link layer addresses of adjacent devices and assigns these addresses to a port opposite to the respective adjacent device, the DEMA-enabled device has the advantage of appearing to be transparent in the link layer address space.

It will be appreciated that a DEMA-enabled monitoring device may be used to monitor a network without being detected by the LAN users, administrators, or other parties accessing the network. Such a monitoring device has the advantage of being able to prevent the detection thereof by address monitoring of data packets or execution of tracing or routing programs.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims.

For example, and without limitation, while the discussion of DEMA has been focused on the RFC 894 Ethernet link-layer protocol, this technique can be readily implemented on other device-addressable link-layer protocols. Other such protocols include IEEE 802.3 Carrier Sense/ Multiple Access with Collision Detection (CSMA/CD), IEEE 802.4 Token Bus, IEEE 802.5 Token Ring, Fast Ethernet, Fiber-Distributed Data Interface (FDDI), and Asynchronous Transfer Mode (ATM). Other protocols are feasible as well.

What is claimed:

1. An apparatus for adapting a link layer address of a network device, said apparatus comprising:
    a first input/output port connected to receive data from a first network node, said first input/output port having a link layer address and being configurable to one of a plurality of link layer addresses;
    a second input/output port connected to output the data to a second network node, said second input/output port having a link layer address and being configurable to one of a plurality of link layer addresses;
    a processor that adapts the link layer address of the first input/output port to correspond to a link layer address of the second network node.

2. The apparatus of claim 1, wherein the link layer address of said first input/output port is an Ethernet MAC address.

3. The apparatus of claim 1, wherein said processor queries the second network node to obtain the link layer address of the second network node.

4. The apparatus of claim 1, wherein said processor queries the second network node to obtain the link layer address of the second network node using Ethernet address resolution protocol.

5. The apparatus of claim 1, wherein the link layer address of the second network node is stored in a memory of said processor.

6. The apparatus of claim 1, wherein said processor adapts the link layer address of the second input/output port to correspond to a link layer address of the first network node.

7. The apparatus of claim 6, wherein the link layer address of said second input/output port is an Ethernet MAC address.

8. The apparatus of claim 6, wherein said processor queries the first network node to obtain the link layer address of the first network node.

9. The apparatus of claim 6, wherein said processor queries the first network node to obtain the link layer address of the first network node using Ethernet address resolution protocol.

10. The apparatus of claim 6, wherein the link layer address of the first network node is stored in a memory of said processor.

11. An apparatus for adapting a link layer address of a network device, said apparatus comprising:
    a first port connected to receive data from a first network node, said first port having a link layer address and being configurable to one of a plurality of link layer addresses;
    a second port connected to output the data to a second network node, said second port having a link layer address and being configurable to one of a plurality of link layer addresses;
    a processor that adapts the link layer address of the first port to correspond to a link layer address of the second network node and adapts the link layer address of the second port to correspond to a link layer address of the first network node.

12. An apparatus for adapting a link layer address of a network node, said apparatus comprising:
    a bus for carrying data;
    a first interface card connected to receive the data from a first network node and output the data to said bus, said first interface card having a link layer address and being configurable to one of a plurality of link layer addresses;
    a second interface card connected to receive the data from said bus and output the data to a second network node, said second interface card having a link layer address and being configurable to one of a plurality of link layer addresses;
    a processor connected to the first and second interface cards, wherein said processor adapts the link layer address of the first interface card to correspond to a link layer address of the second network node.

13. The apparatus of claim 12, wherein the link layer address of said first interface card is an Ethernet MAC address.

14. The apparatus of claim 12, wherein said processor queries the second network node to obtain the link layer address of the second network node.

15. The apparatus of claim 12, wherein said processor queries the second network node to obtain the link layer address of the second network node using Ethernet address resolution protocol.

16. The apparatus of claim 12, wherein the link layer address of the second network node is stored in a memory of said processor.

17. The apparatus of claim 12, wherein said processor adapts the link layer address of the second interface card to correspond to a link layer address of the first network node.

18. The apparatus of claim 17, wherein the link layer address of said second interface card is an Ethernet MAC address.

19. The apparatus of claim 17, wherein said processor queries the first network node to obtain the link layer address of the first network node.

20. The apparatus of claim 17, wherein said processor queries the first network node to obtain the link layer address of the first network node using Ethernet address resolution protocol.

21. The apparatus of claim 17, wherein said processor is programmed with the link layer address of the first network node.

22. An apparatus for adapting a link layer address of a network node, said apparatus comprising:
    a bus for carrying data;
    a first interface card connected to receive the data from a first network node and output the data to said bus, said first interface card having a link layer address and being configurable to one of a plurality of link layer addresses;
    a second interface card connected to receive the data from said bus and output the data to a second network node, said second interface card having a link layer address and being configurable to one of a plurality of link layer addresses;
    a processor connected to the first and second interface cards, wherein said processor adapts the link layer address of the first interface card to correspond to a link layer address of the second network node and said processor adapts the link layer address of the second interface card to correspond to a link layer address of the first network node.

23. A device for preventing unauthorized network monitoring and intrusion, said device comprising:
- a first port connected to receive data from a first network node, said first port having a link layer address and being configurable to one of a plurality of link layer addresses;
- a second port connected to output the data to a second network node, said second port having a link layer address and being configurable to one of a plurality of link layer addresses;
- a processor that adapts the link layer address of the first port to correspond to a link layer address of the second network node.

24. The device of claim 23, wherein said processor adapts the link layer address of the second port to correspond to a link layer address of the first network node.

25. A device for monitoring network data traffic while preventing detection of said device, said device comprising:
- a first port connected to receive data from a first network node, said first port having a link layer address and being configurable to one of a plurality of link layer addresses;
- a second port connected to output the data to a second network node, said second port having a link layer address and being configurable to one of a plurality of link layer addresses;
- a processor for adapting the link layer address of the first port to correspond to a link layer address of the second network node.

26. A device of claim 25, wherein said processor adapts the link layer address of the second port to correspond to a link layer address of the first network node.

27. An apparatus for adapting a link layer address of a network device, said apparatus comprising:
- first means for receiving data from a first network node, said first means having a link layer address and being configurable to one of a plurality of link layer addresses;
- second means for outputting the data to a second network node, said second means having a link layer address and being configurable to one of a plurality of link layer addresses;
- processing means for adapting the link layer address of the first means to correspond to a link layer address of the second network node and adapting the link layer address of the second means to correspond to a link layer address of the first network node.

28. An apparatus for adapting a link layer address of a network node, said apparatus comprising:
- means for carrying data;
- first interface means for receiving the data from a first network node and outputting the data to said means for carrying, said first interface means having a link layer address and being configurable to one of a plurality of link layer addresses;
- second interface means for receiving the data from said means for carrying and outputting the data to a second network node, said second interface means having a link layer address and being configurable to one of a plurality of link layer addresses;
- means connected to the first interface means and the second interface means for adapting the link layer address of the first interface means to correspond to a link layer address of the second network node and adapting the link layer address of the second interface means to correspond to a link layer address of the first network node.

29. A method for adapting a link layer address of a network device, said method comprising the steps of:
- receiving data at a first port from a first network node, the first port having a link layer address and being configurable to one of a plurality of link layer addresses;
- outputting data from a second port to a second network node, the second port having a link layer address and being configurable to one of a plurality of link layer addresses;
- adapting the link layer address of the first port to correspond to a link layer address of the second network node.

30. The method of claim 29, wherein the link layer address of the first port is an Ethernet MAC address.

31. The method of claim 29, wherein in said adapting step, the second network node is queried to obtain the link layer address of the second network node.

32. The method of claim 29, wherein in said adapting step, the second network node is queried to obtain the link layer address of the second network node using Ethernet address resolution protocol.

33. The method of claim 29, wherein in said adapting step, the link layer address of the second network node is retrieved from a memory.

34. The method of claim 29, further comprising the step of adapting the link layer address of the second port to correspond to a link layer address of the first network node.

35. The method of claim 34, wherein the link layer address of the second port is an Ethernet MAC address.

36. The method of claim 34, wherein in said adapting step, the first network node is queried to obtain the link layer address of the first network node.

37. The method of claim 34, wherein in said adapting step, the first network node is queried to obtain the link layer address of the first network node using Ethernet address resolution protocol.

38. The method of claim 34, wherein in said adapting step, the link layer address of the first network node is retrieved from a memory.

39. An method for adapting a link layer address of a network device, said method comprising the steps of:
- receiving data at a first port from a first network node, the first port having a link layer address and being configurable to one of a plurality of link layer addresses;
- outputting data from a second port to a second network node, the second port having a link layer address and being configurable to one of a plurality of link layer addresses;
- adapting the link layer address of the first port to correspond to a link layer address of the second network node and adapting the link layer address of the second port to correspond to a link layer address of the first network node.

40. Computer code executable by a device having a link layer address, said code comprising:
- code for receiving data at a first port from a first network node, the first port having a link layer address and being configurable to one of a plurality of link layer addresses;
- code for outputting data from a second port to a second network node, the second port having a link layer address and being configurable to one of a plurality of link layer addresses;
- code for adapting the link layer address of the first port to correspond to a link layer address of the second network node.

41. The computer code of claim 40, wherein the link layer address of the first port is an Ethernet MAC address.

42. The computer code of claim 40, further comprising code for querying the second network node to obtain the link layer address of the second network node.

43. The computer code of claim 40, further comprising code for querying the second network node to obtain the link layer address of the second network node using Ethernet address resolution protocol.

44. The computer code of claim 40, further comprising code for retrieving the link layer address of the second network node from a memory.

45. The computer code of claim 40, further comprising code for adapting the link layer address of the second port to correspond to a link layer address of the first network node.

46. The computer code of claim 45, wherein the link layer address of the second port is an Ethernet MAC address.

47. The computer code of claim 45, further comprising code for querying the first network node to obtain the link layer address of the first network node.

48. The computer code of claim 45, further comprising code for querying the first network node to obtain the link layer address of the first network node using Ethernet address resolution protocol.

49. The computer code of claim 45, further comprising code for retrieving the link layer address of the first network node from a memory.

50. Computer code executable by a device having a link layer address, said code comprising:

code for receiving data at a first port from a first network node, the first port having a link layer address and being configurable to one of a plurality of link layer addresses;

code for outputting data from a second port to a second network node, the second port having a link layer address and being configurable to one of a plurality of link layer addresses;

code for adapting the link layer address of the first port to correspond to a link layer address of the second network node and adapting the link layer address of the second port to correspond to a link layer address of the first network node.

* * * * *